United States Patent [19]

Aida et al.

[11] Patent Number: 5,221,781

[45] Date of Patent: Jun. 22, 1993

[54] FILLER-INCORPORATED THERMOPLASTIC RESIN COMPOSITION

[75] Inventors: Fuyuki Aida, Tokyo; Tsutomu Miyamoto, Ibaragi; Masaaki Miyazaki, Yokohama, all of Japan

[73] Assignee: Nippon Petrochemicals Company, Limited, Tokyo, Japan

[21] Appl. No.: 724,440

[22] Filed: Jul. 2, 1991

Related U.S. Application Data

[63] Continuation of Ser. No. 545,332, Jun. 26, 1990, abandoned.

[30] Foreign Application Priority Data

Jun. 28, 1989 [JP] Japan .................................. 1-163643
Jun. 28, 1989 [JP] Japan .................................. 1-163644

[51] Int. Cl.$^5$ .............................................. C08K 3/18
[52] U.S. Cl. ........................................ 524/433; 524/437; 524/451; 524/490; 524/570; 524/575.5; 524/584; 524/586; 525/331.7; 525/333.7; 525/375; 525/383; 525/385
[58] Field of Search .............. 524/433, 437, 490, 570, 524/575.5, 584, 586; 525/331.7, 333.7, 383, 385, 375

[56] References Cited

U.S. PATENT DOCUMENTS

| | | |
|---|---|---|
| Re. 31,518 | 2/1984 | Fischer . |
| Re. 32,028 | 11/1985 | Fischer . |
| 3,806,558 | 4/1974 | Fischer . |
| 4,212,787 | 7/1980 | Matsuda et al. . |
| 4,247,652 | 1/1981 | Matsuda et al. . |
| 4,918,127 | 4/1990 | Adur et al. .......................... 524/437 |

FOREIGN PATENT DOCUMENTS 324278 7/1989 European Pat. Off. .............. 524/87
1010549 11/1965 United Kingdom .

Primary Examiner—Melvyn I. Marquis
Assistant Examiner—Mark Sweet
Attorney, Agent, or Firm—Dilworth & Barrese

[57] ABSTRACT

A thermoplastic resin composition well-balanced in rigidity, resistance to impact and to heat, dimensional stability, flame retardance and moldability, prepared by incorporating an inorganic filler and/or a flame retardant into a thermoplastic resin composition containing a partially crosslinked product obtained by dynamically heat-treating a thermoplastic resin and/or a rubbery substance in the presence of at least one crosslinking agent selected from a dihydroaromatic series compound or a polymer thereof, an ether series compound, a tetrahydroaromatic series compound, and a cyclopentane series compound, and also in the presence of a polyfunctional monomer.

10 Claims, No Drawings

FILLER-INCORPORATED THERMOPLASTIC RESIN COMPOSITION

This is a continuation of copending application Ser. No. 07/545,332, filed on Jun. 26, 1990, now abandoned.

BACKGROUND OF THE INVENTION

The present invention relates to a filler-incorporated thermoplastic resin composition and more particularly to a thermoplastic resin composition well-balanced in rigidity, resistance to impact and to heat, dimensional stability, flame retardance and moldability, prepared by incorporating an inorganic filler and/or a flame retardant into a thermoplastic resin composition containing a partially crosslinked product obtained by dynamically heat-treating a thermoplastic resin and/or a rubbery substance using a specific crosslinking agent.

Heretofore, for the modification of a thermoplastic resin composition, that is, for the purpose of improving rigidity, dimensional stability and flame retardance, it has been well known to incorporate and inorganic filler and a flame retardant into a thermoplastic resin.

For example, general-purpose synthetic resins typified by polyethylene are disadvantageous in that they are poorly receptive of inorganic fillers and inorganic flame retardants and that if fillers are incorporated in a large amount into those resins for the purpose of improving rigidity and heat resistance or flame retardancy of the resins, the mechanical strength, flexibility and processability of the resulting resin compositions will be deteriorated to an unpractical extent.

Thus, there is a limit on the amount of fillers capable of being used; that is, a limit is encountered in attaining a high modification effect.

Further, thermoplastic resins have the drawback that they are easy to burn because of organic compounds. Besides, their burning energy is very powerful, thus giving rise to great danger in the event of a fire. In view of this point there have been proposed methods for making thermoplastic resin compositions flame-retardant.

According to the most general method among them, organic polymers can be rendered flame-retardant by incorporating therein flame retardants containing halogen or phosphorus.

However, these organic flame retardants have a serious drawback of evolving noxious gases when they burn.

Recently, flame-retardant compositions have been required to be more highly flame-retardant from the standpoint of preventing a fire.

Under the circumstances, as low-smoking, pollution-free flame retardants not evolving noxious gases during burning unlike organic flame retardants, inorganic flame retardants such as magnesium hydroxide and aluminum hydroxide meet the aforementioned needs and are now in increasing demand rapidly (see, for example, Japanese Patent Laid Open No. 13832/1985).

The degree of flame retardance attained increases with increase in the amount of such inorganic flame retardants used.

On the other hand, the increase in the amount of inorganic fillers and inorganic flame retardants results in not only deteriorated mechanical strength and processability but also marked impairment of flexibility and cold resistance.

To maintain those properties in satisfactory condition there been proposed the use of polymers having polar groups highly receptive of fillers, the use of a soft substance (e.g. rubber) for retaining flexibility, or the use of a soft substance as matrix itself.

However, in the use of a filler in a large amount, a mere incorporation therein of a small amount of a soft substance will be poor in the effect of improving the mechanical strength, etc. thereof, so it becomes necessary to use a soft substance in a large amount, thus causing deterioration in the heat resistance of the resulting composition.

To improve the heat resistance of the resin composition such soft substance incorporated therein, there generally is adopted a crosslinking means for the composition.

Usually, in a crosslinking reaction there is adopted a method which employs a free radical forming agent typified by an organic peroxide. However, organic peroxides involve the following problems because of high activity thereof.

For example, in the case of using a peroxide disintegrating type thermoplastic resin such as polypropylene, there is obtained a composition having high fluidity, while on the other hand since there rapidly occurs thermal decomposition of the organic peroxide used, a molecule cutting reaction is unavoidable, thus causing deterioration in mechanical strength such as rigidity and yield tensile strength.

In the case of using a peroxide crosslinking type resin such as polyethylene, a crosslinking reaction will proceed to an extreme degree, thus causing marked deterioration of fluidity, with the result that the moldability is deteriorated to an extent of molding being difficult, and in order to retain good moldability it is necessary to use a very small amount of an organic peroxide, so the handling thereof is difficult (see, for example, Japanese Patent Laid Open Nos. 10 47/1975, 23244/1974 and 102 6/1974).

Further, the organic peroxide remaining in the composition deteriorates thermal stability and weathering resistance.

Thus, in both the above method of performing a crosslinking reaction using a peroxide and the above method using a soft substance, deterioration of mechanical strength is unavoidable.

Other problems involve a problem in management relating to the stability and safety of a peroxide during storage, and a thermal decomposition loss caused by the adhesion of a peroxide to the walls of a heated processing machine. It has been desired to solve these problems.

Thus, none of conventional thermoplastic resin compositions with fillers such as inorganic filler and/or flame retardants incorporated therein are fully satisfactory in practical use, and so it has been desired to provide an improved composition.

SUMMARY OF THE INVENTION

The present invention has been effected in view of the above-mentioned points and it is the object thereof to provide a filler-incorporated thermoplastic resin composition remarkably superior in moldability without deterioration in mechanical strength such as tensile strength and rigidity and in heat resistance as compared with like compositions prepared by conventional simple blending method and crosslinking method using peroxide.

Particularly, the present invention has for its object the provision of a thermoplastic resin composition which permits the incorporation therein an inorganic filler and/or an inorganic flame retardant in a high proportion and which can be utilized for various industrial materials.

A thermoplastic resin composition with a flame retardant incorporated therein is superior in electrical characteristics so is employable as an electric material such as insulator or a sheath for electric wire or cable. Further, it is applicable to molding uses, including extrusion and injection molding for packings, sealers, hoses and films. It is also utilized as master batch.

Having made extensive studies for achieving the above-mentioned object, the present inventors accomplished the present invention.

More specifically, the present invention resides in a filler-incorporated thermoplastic resin composition comprising:

100 parts by weight of a thermoplastic resin containing a partially crosslinked composition, the said partially crosslinked composition being obtained by dynamically heat-treating (A) a thermoplastic resin and/or
(B) a rubbery substance in the presence of at least one crosslinking agent selected from (C) a dihydroaromatic series compound or a polymer thereof,
(D) an ether series compound,
(E) a tetrahydroaromatic series compound, and
(F) a cyclopentane series compound, and also in the presence of (G) a polyfunctional monomer; and
(H) 5-200 parts by weight of a filler.

DETAILED DESCRIPTION OF THE INVENTION

Examples of the thermoplastic resin (A) used in the present invention are polyolefin resins such as $\alpha$-olefin (co)polymers having 2 to 10 carbon atoms, e.g. high and medium density polyethylenes, low density polyethylenes, linear low density polyethylenes, very low density polyethylenes, polypropylenes, poly-1-butene, poly-4-methyl-1-pentene, copolymers of $\alpha$-olefins such as ethylene, propylene, butene-1, hexene-1 and 4-methyl-1-pentene, copolymers of ethylene and polar group-containing monomers such as ethylene-unsaturated carboxylate copolymer and ethylene-carboxylic acid unsaturated ester copolymer as well as polystyrene resins, polyacrylonitrile resins, polymethacrylate, polyacetal resins, polyamide resins, and polyester resins. These may be used each alone or as mixtures. Particularly, polyolefin resins are most preferred in point of versatility and inexpensiveness.

As examples of the rubbery substance (B) used in the present invention there are mentioned ethylene-$\alpha$-olefin copolymer rubbers, e.g. ethylene-propylene random copolymer rubber, ethylene-propylene-diene random copolymer rubber (EPDM), 1,2-polybutadiene, styrene-butadiene-styrene block copolymer rubber, natural rubber, nitrile rubber, and isobutylene rubber. These may be used each alone or as mixtures. Particularly, ethylene-propylene random copolymer rubber and ethylene-propylene-diene random copolymer rubber are preferred.

These two rubbers just referred to above have advantages in operation; for example, they are superior in thermoplasticity as compared with the other rubbery substances, easily dispersed by melt-kneading, do not have a peculiar offensive odor in comparison with SBR, isoprene rubber, nitrile rubber, or butadiene rubber, available as pellets so easy to be weighed and handled at the time of mixing, and have a high degree of freedom with respect to the type of a composition preparing apparatus.

As to the diene component in the foregoing ethylene-propylene-diene random copolymer rubber, there may be used any of known ones such as, for example, ethylidene norbornene, 1,4-hexadiene and dicyclopentadiene.

The ratio of the above components (A) and (B) is in the range of 100~0/0~100 in terms of (A)/(B), preferably 95~5/5~95, more preferably 90~10/10~90.

The dihydroaromatic series compound (C) used as a crosslinking agent in the present invention is a compound containing one or more aromatic rings, of which one aromatic ring is dihydrogenated. The aromatic ring as referred to herein indicates a ring structure having $4n+2$ (n is an integer) of $\pi$-electrons shown in the definition of aromaticity [see, for example, "Yuki Kagaku no Kiso," Tokyo Kagaku Donin K. K. (1976), translated by Toshio Goto, pp. 105-106, (Richard S. Monson & John C. Shelton, "Fundamentals of Organic Chemistry," MacGraw-Hill, Inc. (1974)]. Pyridine and quinoline are included as examples. Therefore, examples of the dihydroaromatic compounds used in the present invention include dihydro derivatives of quinoline. Further, the dihydroaromatic compound used in the present invention may contain a substituent group. Alkyl substituted compounds, as well as derivatives substituted with various elements and functional groups, are employable.

The dihydroaromatic compound used in the invention can be prepared by a known chemical reaction. Examples of those available at present are 1,2-dihydrobenzene, cis-1,2-dihydrocatechol, 1,2-dihydronaphthalene, 9,10-dihydrophenanthrene, as well as 1,2-dihydroquinoline compounds such as 6-decyl-2,2,4-trimethyl-1,2-dihydroquinoline, 6-ethoxy-2,2,4-trimethyl-1,2-dihydroquinoline, and 2,2,4-trimethyl-1,2-dihydroquinoline. Polymers of these compounds are also employable.

Among the dihydroaromatic compounds employable in the present invention there are included those which have heretofore been known as antioxidant agents (see, for example, Japanese Patent Publication No. 46661/1980), but these have been used not as crosslinking agents but together with conventional crosslinking agents such as sulfur compounds, organic peroxides, phenolic compounds and quinone dioxime compounds.

Thus, the prior art is lacking in the knowledge of the present invention, i.e., the knowledge that dihydroaromatic compounds and polymers exhibit crosslinking-reactivity, or the knowledge of the effect that a combined use of such dihydroaromatic compound and a polyfunctional monomer permits a mild crosslinking reaction to proceed.

The ether series compound (D) used as crosslinking agent in the present invention may be straight-chained or cyclic, or may contain a substituent group. Examples are cyclic ethers such as 1,3-dioxolan and 1,4-dioxane; straight chain ethers such as ethyl ether and isopropyl ether; non-aromatic cyclic vinyl ethers typified by 3,4-dihydro-2-pyran and 4H-chromene; furan derivatives typified by furfuryl alcohol, furfuryl aldehyde, benzofuran and furfuryl acetate; straight chain vinyl ether compounds typified by n-octadecyl vinyl ether and ethyl vinyl ether; enol ethers and enol esters of carbonyl compounds such as ketones, esters, lactones, aldehydes, amides and lactams typified by ketene acetal, isopropenyl acetate, vinyl acetate and 1-amino-1-methoxyethylene. These compounds may contain substituent groups. Alkyl substituted compounds as well as derivatives substituted with various elements and functional groups. And these compounds may be used each alone or as mixtures. Particularly, vinyl or alkenyl ethers are preferred.

The tetrahydroaromatic series compound (E) used as a crosslinking agent in the present invention indicates a compound in which at least one aromatic ring is tetrahydrogenated. The said aromatic ring has the same meaning as in the foregoing definition of aromaticity. For example, furan, benzene and naphthalene are included, while pyran is excluded. Therefore, examples of the tetrahydroaromatic compound used in the present invention include tetrahydro derivatives of naphthalene. Further, the tetrahydroaromatic compound in question may contain a substituent group. Alkyl substituted compounds and derivatives substituted with various elements and functional groups are also employable. The tetrahydroaromatic compound used in the invention can be prepared by a known chemical reaction. Examples of those available at present include 1,2,3,4-tetrahydronaphthalene, tetrahydrobenzene and tetrahydrofuran. Polymers of these compounds are also employable.

The cyclopentane series compound (F) used as a crosslinking agent in the present invention is a compound containing at least one cyclopentane, cyclopentene or cyclopentadiene skeleton. That is, the compound is a five-membered compound whose ring is constituted by only carbon atoms. Examples include cyclopentane, cyclopentadiene, dicyclopentadiene, indene, indane, and fluorene. Of course, these compounds may contain substituent groups. Alkyl substituted compounds and drivative substituted with various elements and functional groups are employable. And these compounds may be used each alone or as mixtures.

In the present invention it is necessary to use the polyfunctional monomer (G) together with at least one crosslinking agent selected from the above components (C), (D), (E) and (F).

Examples of the polyfunctional monomer (G) include higher esters of methacrylic acid typified by trimethylolpropane trimethacrylate and ethylene glycol dimethacrylate; polyfunctional vinyl monomers typified by divinylbenzene, triallyl isocyanurate and diallyl phthalate; and bismaleimides typified by N,N-m-phenylene bismalemide and N,N'-ethylene bismaleimide. Particularly, bismaleimide compounds and di(meth)acrylate compounds are preferred because these compounds are highly reactive and the addition of polar groups leads to the improvement in dispersibility and receptivity of fillers such as inorganic fillers and flame retardants, e.g. metal oxides. These compounds may be used in combination of two or more.

As examples of the filler (H) used in the present invention there are mentioned inorganic and organic fillers, as well as flame retardants.

Examples of inorganic fillers are known inorganic fillers, including powdered, plate-like, scaly, needle-like, spherical and hollow ones, as well as fibers. More concrete examples are such powdered fillers as calcium carbonate, magnesium carbonate, calcium sulfate, calcium silicate, clay, diatomaceous earth, talc, alumina, glass powder, iron oxide, metal powder, graphite, silicon carbide, silicon nitride, silica, boron nitride, aluminum nitride, and carbon black; metallic foils such as mica, glass sheet, sericite, pyrophllite, and alum frake; plate- or scale-like fillers such as graphite; hollow fillers such as Shirasu balloon, metal balloon and pumice; and mineral fibers such as glass fibers, carbon fibers, graphite fibers, whisker, metallic fibers, silicon carbide fibers, asbestos, and wollastonite.

These inorganic fillers may be used each alone or as mixtures. The kind and amount may be determined according to purposes. For the improvement of dispersibility, these fillers may be subjected to a surface treatment using, for example, a silane coupling agent, an organic titanate-based coupling agent, or a metallic salt of a fatty acid.

As examples of organic fillers there are mentioned wooden powder, chaff, shellac, coconut husk powder, cork powder, cellulose powder, natural and synthetic fibers, pulp, paper, and cloth.

The above inorganic or organic fillers are used in an amount in the range of 5 to 200, preferably 7 to 180, more preferably 10 to 150, parts by weight based on 100 parts by weight of the entire resin composition. If the amount is smaller than 5 parts by weight, there will not be obtained a satisfactory effect, while if it exceeds 200 parts by weight, mechanical properties, e.g. tensile elongation, will be deteriorated.

As the flame retardant in the present invention there is used an additive type flame retardant such as a halogen-based flame retardant, a phosphorus-based flame retardant, or an inorganic flame retardant.

Examples of halogen-based flame retardants are general halogen-based flame retardants, including bromine-based flame retardants such as tetrabromobisphenol A (TBA), hexabromobenzene, decabromodiphenyl ether, tetrabromoethane (TBE), tetrabromobutane (TBB), and hexabromocyclodecane (HBCD); chlorine-based flame retardants such as chlorinated paraffin, chlorinated polyphenyl, chlorinated polyethylene, chlorinated diphenyl, perchloropentacyclodecane, and chlorinated naphthalene: halogenated polystyrene such as brominated polystyrene and brominated poly-α-methylstyrene, and derivatives thereof; halogenated polycarbonates such as brominated polycarbonate; halogenated polyesters such as polyalkylene tetrabromo terephthalates and brominated terephthalic acid type polyesters; halogenated epoxy compounds such as halogenated bisphenol type epoxy resins; halogenated polyphenylene oxide compounds such as poly(dibromophenylene oxide); and halogen-containing polymers such as cyanuric esters of halogenated bisphenols. These compounds are rendered more effective by being used together with a flame retarding aid, e.g. antimony trioxide.

Examples of phosphorus-based flame retardants include phosphoric esters and halogenated phosphric esters and halogenated phosphoric esters, such as tricresyl phosphate, tri(β-chloroethyl) phosphate, tri(dribromopropyl)phosphate, and 2,3-dibromopropyl-2,3-dibromopropyl-2,3-chloropropyl phosphate.

Examples of inorganic flame retardants include hydrates of inorganic metallic compounds such as aluminum hydroxide, magnesium hydroxide, dolomite, hydrotalcite, calcium hydroxide, barium hydroxide, basic magnesium carbonate, zirconium hydroxide, and hydrate of tin oxide; as well as zinc borate, zinc metaborate, barium metaborate, zinc carbonate, magnesium carbonate, calcium carbonate, barium carbonate, magnesium oxide, molybdenum oxide, zirconium oxide, tin oxide, antimony oxide, and red phosphorus. These compounds may be used each alone or in combination of two or more. Particularly, magnesium hydroxide, aluminum hydroxide, basic magnesium carbonate and hydrotalcite are superior in the flame retarding effect and are advantageous from the economic viewpoint. The particle size of these flame retardants differ, depending on the kind. In the cases of magnesium hydroxide and aluminum hydroxide, it is preferable that an average particle size be not larger than 20 μm. The amount of these flame retardants is in the range of 5 to 200, preferably 7 to 150, parts by weight based on 100 parts by weight of the resin.

Particularly, in the case of using only organic flame retardants, the amount thereof is in the range of 5 to 20 parts by weight, while in the case of using only inorganic flame retardants, the amount thereof is in the range of 40 to 200 parts by weight.

If the amount is smaller than 5 parts by weight, there will not be obtained a satisfactory flame retarding effect, while an amount exceeding 200 parts by weight will result in the composition being deteriorated in mechanical strength, elongation and low-temperature characteristics, impaired in flexibility and becoming fragile.

In the present invention, at least one of the above-exemplified additive type flame retardants is used, and in the case of using a halogen-based flame retardant, it is desirable to use in combination with antimony trioxide.

The inorganic fillers and flame retardants exemplified above may be used together in a suitable combination.

The partially crosslinked composition used in the present invention is obtained by mixing the thermoplastic resin (A), rubbery substance (B), crosslinking agent (C), (D), (E), (F), and the polyfunctional monomer (G), in advance or at the time of heat treatment and then heat-treating the resulting mixture.

As to the partially crosslinked composition obtained by such dynamic heat treatment, the boiling xylene insolubles content in the composition obtained by melt-kneading the said mixture is increased as compared with that before the kneading.

Such increase of the boiling xylene insolubles content attained by the aforementioned heat treatment is one criterion about the effect of the present invention.

Generally, the higher the boiling xylene insolubles content, the greater the improvement in the effect of addition of a rubbery substance, including the improvement of impact resistance and tensile strength.

Such increase of the boiling xylene insolubles content depends mainly on the amount of the crosslinking agent (C), (D), (E), (F) used. More specifically, the amount of the crosslinking agent used differs depending on the kind of the crosslinking agent and activator used or the melt-kneading apparatus and conditions used, but actually the crosslinking agent (C), (D), (E), (F) and the polyfunctional monomer (G) are each used in an amount of 0.01 to 7, preferably 0.05 to 4, parts by weight based on the total weight of the thermoplastic resin (A) and/or the rubbery substance (B).

If the amount in question is smaller than 0.01 part by weight, the effect of crosslinking will be poor, and if it exceeds 7 parts by weight, there will occur bleeding to the surface, coloration and increase of cost in the case of the polyfunctional monomer, while in the case of the crosslinking agent, coloration and increase of cost will result.

The temperature of the foregoing dynamic heat treatment is not lower than the melting point or softening point of thermoplastic resin and/or the rubbery substance and below the decomposition point thereof. It is preferable that the dynamic heat treatment be conducted at a temperature in the range of 120° to 350° C. for 20 seconds to 20 minutes.

It is preferable that the melt kneading be carried out using a mixing machine which affords a high shear rate to facilitate the formation of radical in the mixture. And it is particularly desirable to remove unreacted monomer from a vent hole.

As the melt-kneading apparatus for the dynamic heat treatment there may be used a known apparatus such as open type mixing rolls, a non-open type Bumbury's mixer, an extruder, a kneader, or a twin-screw extruder.

The filler (H) used in the present invention may be added the total amount thereof or in a suitably divided manner during and/or after the above heat treatment, but in order to enhance the compatibility of the composition with the inorganic filler and flame retardant it is preferable that the filler (H) be melt-kneaded together with the other components at the time of the heat treatment.

The composition of the present invention is improved its compatibility by containing the partially crosslinked product described above, and in point of physical properties it is desirable that the content thereof in the resin be at least 10 wt %, more preferably 20 wt % or more, still more preferably 30 wt % or more.

If necessary, a softening agent may be used during and/or after the heat treatment. As the softening agent there is used any of those commonly named extender oils which are used mainly for improving the processability of rubber, for extension purpose, or for improving the dispersibility of fillers.

The extender oils are high-boiling petroleum components, which are classified into paraffinic, naphthenic and aromatic oils. Not only these petroleum fractions but also synthetic oils such as liquid polyisobutene are also employable in the present invention.

As the resin incorporated in the partially crosslinked product there may be used the foregoing component (A) and/or (B). No special limitation is placed on the resin within the range not departing from the gist of the present invention.

In the composition of the present invention there may be incorporated, if necessary, a stabilizer, an antioxidant, an ultraviolet ray absorber, a lubricant, a foaming agent, an antistatic agent, a plasticizer, a dye, and a pigment.

Thus, according to the present invention, by using a dihydroaromatic compound, an ether compound, a tetrahydroaromatic compound, or a cyclopentane compound, as a crosslinking agent together with a polyfunctional monomer, it is possible to suppress an extreme crosslinking reaction which is a drawback in the conventional crosslinking method using an organic peroxide, and it is possible to obtain a product which is partially crosslinked to a desired extent in the range from an extremely slightly crosslinked state to a crosslinked state to an extreme degree. Further, the presence of a polar group enhances the compatibility of the resin composition with the filler such as the inorganic fuller and/or the flame retardant, thus permitting the filler to be incorporated in the resin in a high proportion, whereby heat resistance, mechanical strength, flame retardance, etc. can be improved without impairing the flexibility and processability of the resin itself.

Particularly, by using a hydrate of an inorganic metallic compound such as, for example, aluminum hydroxide or magnesium hydroxide there can be obtained a low-smoking, pollution-free type flame-retardant resin composition which does not evolve noxious gases during combustion. Thus, since the filler can be incorporated in the composition in a high proportion, there can be attained a high degree of flame retardancy eventually.

Further, since the flame-retardant, thermoplastic resin composition of the present invention is superior in electrical characteristics, it is employable as an electric insulator for electric wires and cables or as an electric material such as a sheath. For example, it is suitably used in places where a high degree of flame retardancy is required, such as where there are various cables for plants, fire-proof electric wires, or general household wires. Also, the composition of the present invention is applicable to molding uses, for example, for the production of extruded or injection-molded products such as films, sheets and pipes, or as master batch. Further, it is employable as panels, packaging materials, furniture and household utensils in various fields, including the fields of fibers, electricity, electronics, automobiles, ships, aircraft, construction, and civil engineering.

The present invention will be described below more concretely in terms of examples, but the invention is not limited thereto.

EXAMPLES 1-14 AND COMPARATIVE EXAMPLES 1-6

Thermoplastic resins (A), rubbery substances (B), inorganic fillers (H), crosslinking agents (C), (D), (E), (F), and polyfunctional monomers (G) were mixed together in such proportions as shown in Table 1. Test pieces were obtained by injection molding followed by annealing, unless otherwise described.

How to prepare compositions, conditions for preparing the test pieces by injection molding, and testing methods, are as follows.

HOW TO PREPARE COMPOSITIONS

1) Each composition was prepared by mixing thermoplastic resin. (A), rubbery substance (B), filler (H), crosslinking agent (C), (D), (E), (F) and polyfunctional monomer (G) in the corresponding proportions shown in Table 1 by means of a Henschel mixer;

2) Then, melt-kneading the resulting mixture at a resin temperature of 180°-260° C. and a revolution of 200 rpm, using a continuous twin-screw extruder (30 mm dia., a product of Plastic Kogaku Kenkyu-Sho K.K.).

| CONDITIONS FOR INJECTION MOLDING | |
|---|---|
| Molding machine | IS-90B (a product of Toshiba Machine Co., Ltd.) |
| Injection pressure | 1,000 kg/cm² |
| Molding temperature | 180-260° C. |
| Mold temperature | 50° C. |

TESTING AND MEASURING METHOD (Ultimate Yield Strength) and (Ultimate Elongation Length)

According to JIS K6760, K6758 and K7113.
(Heat Deformation Temperature)
According to JIS K7270, using a load of 4.6 kg.
(Flexural Modulus)
According to JIS K6768 and K7203.
(Izod Impact Value)
According to JIS K6758 and K7110.
(Boiling Xylene Insolubles Content)

A 20 mm×50 mm×0.12 mm film was formed by pressing, then placed in a wire gauze of 120 mesh and then immersed in boiling xylene for 5 hours. The weight of the film before the immersion and that after the immersion were measured and a boiling xylene insolubles content was determined from the following equation:

$$\text{Boiling Xylene Insolubles Content (wt \%)} = \frac{\text{Weight (g) of film after immersion in boiling xylene}}{\text{Weight (g) of film before immersion in boiling xylene}} \times 100$$

EXAMPLES 15-24 AND COMPARATIVE EXAMPLES 7-16

Thermoplastic resins (A), rubbery substances (B), flame retardants (I), crosslinking agents (C), (D), (E), (F), and polyfunctional monomers (G) were mixed in such proportions as shown in Table 2, 3. Test pieces were prepared by pressing the resulting compositions to a desired thickness by means of a pressing machine followed by annealing, unless otherwise described.

How to prepare compositions and testing methods are as follows:

How to Prepare Compositions

1) Each composition was prepared by mixing thermoplastic resin (A), rubbery substance (B), inorganic filler (I), crosslinking agent (C), (D), (E), (F) and polyfunctional monomer (G) in predetermined proportions by means of a Henschel mixer;

2) Then, melt-kneading the resulting mixture at a resin temperature of 180°-260° C. and a revolution of 220 rpm, using a continuous twin-screw kneader/extruder (300 mm dia., a product of Plastic Kogaku Kenkyu-Sho K.K.).

Testing and Measuring Method

1. Ultimate Tensile Strength

Using TENSILON, a test piece of No. 3 dumbbell punched from 1 mm thickness was measured for tensile strength at a rate of 200 mm/min.

2. Heat Resistance (Percent Heat Deformation)

A column of 6 mm in thickness and 10 mm in diameter was pressed at a load of 2.64 kg in an oil bath held at 100° C., and a percent deformation after 30 minutes was obtained.

3. Flame Retardance

According to UL-94 standard.

4. Oxygen Index (O.I.). . D. 2863 — A.S.T.M.

$$O.I. = \frac{\text{Flow rate of oxygen}}{\text{Flow rate of oxygen + Flow rate of nitrogen}} \times 100$$

Oxygen index indicates a minimum oxygen concentration necessary for the sample to burn continuously for 3 minutes or more or continue to burn over 50 mm in terms of burning length.

5. Izod Impact Value (notched)

Measured at 25° C. according to JIS K7110.

The following are the thermoplastic resins, inorganic fillers, crosslinking agents and polyfunctional monomers used herein.

(A) Thermoplastic Resins
(A1) Polypropylene (1)
 (trade name: Nisseki Polypro J420G, MFR=1.5, a product of Nippon Petrochemicals Co., Ltd.)
(A2) Polypropylene (2)
 (trade name: Nisseki Polypro J650G, MFR=8.0, a product of Nippon Petrochemicals Co., Ltd.)
(A3) Polypropylene (3)
 (trade name: Nisseki Polypro J871M, MFR=23, a product of Nippon Petrochemicals Co., Ltd.)
(A4) Ethylene-Butene-1 copolymer
 (MI=1.0 g/10 min, density=0.905 g/cm$^3$)
(A5) Low density polyethylene
 (trade name: Nisseki Rexlon W2000, MI=1.0, a product of Nippon Petrochemicals Co., Ltd.)
(A6) Linear low-density polyethylene
 (trade name: Nisseki Linirex AM 1720, MI=0.8, density=0.935 g/cm$^3$, a product of Nippon Petrochemicals Co., Ltd.)
(A7) Polyethylene terephthalate
 (Intrinsic viscosity: 2.2 dl/g)
(A8) Polybutylene terephthalate
 Intrinsic viscosity: 1.9 dl/g)
(B) Rubbery Substances
(B1) Ethylene-Propylene random copolymer rubber (1)
 (trade name: EP02P, a product of Japan Synthetic Rubber Co., Ltd.)
(B2) Ethylene-Propylene random copolymer rubber (2)
 (trade name: EP07P, a product of Japan Synthetic Rubber Co., Ltd.)
(B3) Ethylene-Propylene-Diene random copolymer rubber (1)
 (trade name: EP57P, a product of Japan Synthetic Rubber Co., Ltd.)
(B4) Ethylene-Propylene-Diene random copolymer rubber (2)
 (trade name: EP22, a product of Japan Synthetic Rubber Co., Ltd.)
Crosslinking Agent: Dihydroaromatic Series Compounds
(C1) Poly(2,2,4-trimethyl-1,2-dihydroquinoline)
 (trade name: Nocrac 224S, a product of Ohuchi Shinko Kagaku K.K.)
(C2) 9,10-Dihydrophenanthrene
 (a product of Tokyo Kasei K.K.)
Crosslinking Agent: Ether Series Compounds
(D1) 3,4-dihydro-2-pyran
 (a product of Tokyo Kasei K.K.)
(D2) Isopropenyl acetate
 (a product of Tokyo Kasei K.K.)
Crosslinking Agent: Tetrahydroaromatic Series Compounds
(E1) 1,2,3,4-Tetrahydronaphthalene
 (a product of Tokyo Kasei K.K.)
(E2) Tetrahydrobenzene
 (a product of Tokyo Kasei K.K.)
(E3) Tetrahydrofuran
 (a product of Tokyo Kasei K.K.)
Crosslinking Agent: Cyclopentane Series Compound
(F1) Indene
 (a product of Tokyo Kasei K.K.)
Polyfunctional Monomers
(G1) N,N'-m-phenylene bismaleimide
 (trade name: Vulnoc PM, a product of Ohuchi Shinko Kagaku K.K.)
(G2) Ethylene glycol dimethacrylate
 (a product of Tokyo Kasei K.K.)
(H) Inorganic Fillers
(H1) Talc
(H2) Calcium carbonate
(H3) Barium sulfate
(H4) Mica
(H5) Silane-treated talc
(H6) Wollastonite
(H7) Aminosilane-treated wollastonite
(I) Flame Retardants
(I1) Magnesium hydroxide
 (trade name: Kisuma 5B, a product of Kyowa Kagaku K.K.)
(I2) Halogen-based flame retardant
 Tetrabromobisphenol A derivative
 (trade name: Fire Guard 3000, a product of Teijin Kasei K.K.), used together with antimony trioxide
(I3) Brominated polystyrene
 (trade name: Pyrocheck 68PB, a product of Nissan Ferro Yuki K.K.)
(J) Others (Organic Peroxide)
(J1) α, α-Bis(t-butyl peroxide)-m-diisopropylbenzene
 (trade name: Perbutyl P, a product of Nippon Oils & Fats Co., Ltd.)

TABLE 1

| | Resin Composition Component (A) and Component (B) | | | | | | Inorganic filler H | | Crosslinking Agent | |
|---|---|---|---|---|---|---|---|---|---|---|
| Ex. | Kind | Amount (wt %) | Kind | Amount (wt %) | Kind | Amount (wt %) | Kind | Amount (wt part) | Kind | Amount (wt part) |
| Ex. 1 | A1 | 100 | — | — | — | — | H1 | 150 | C1 | 0.50 |
| Comp. Ex. 1 | A1 | 100 | — | — | — | — | H1 | 150 | — | — |
| Ex. 2 | A2 | 20 | — | — | B3 | 80 | H1 | 100 | C2 | 0.50 |
| Comp. Ex. 2 | A2 | 20 | — | — | B3 | 80 | H1 | 100 | — | — |
| Comp. Ex. 3 | A2 | 20 | — | — | B3 | 80 | H1 | 100 | I1 | 0.50 |
| Ex. 3 | A2 | 75 | B1 | 25 | — | — | H1 | 25 | D1 | 0.50 |
| Ex. 4 | A2 | 50 | B2 | 25 | B4 | 25 | H1 | 25 | D2 | 0.50 |
| Ex. 5 | A2 | 60 | B1 | 15 | B4 | 25 | H1 | 25 | E1 | 0.50 |
| Ex. 6 | A2 | 75 | — | — | B3 | 25 | H1 | 25 | E2 | 0.50 |
| Ex. 7 | A2 | 75 | — | — | B4 | 25 | H2 | 25 | E3 | 0.50 |
| Ex. 8 | A2 | 75 | — | — | B4 | 25 | H3 | 25 | F1 | 0.50 |
| Ex. 9 | A2 | 75 | — | — | B4 | 25 | H4 | 25 | C1 | 0.50 |
| Ex. 10 | A3 | 72 | B2 | 28 | — | — | H5 | 11 | D1 | 0.50 |
| Comp. Ex. 4 | A3 | 72 | B2 | 28 | — | — | H5 | 11 | — | — |

TABLE 1-continued

| Ex. | | | | | | | | | | |
|---|---|---|---|---|---|---|---|---|---|---|
| Ex. 11 | A3 | 72 | B2 | 28 | — | — | H6 | 11 | F1 | 0.50 |
| Comp. Ex. 5 | A3 | 72 | B2 | 28 | — | — | H6 | 11 | | — |
| Ex. 12 | A3 | 72 | B2 | 28 | — | — | H7 | 11 | E1 | 0.50 |
| Comp. Ex. 6 | A3 | 72 | B2 | 28 | — | — | H7 | 11 | | — |
| Ex. 13 | A3 | 72 | A4 | 28 | — | — | H7 | 11 | E1 | 0.50 |
| Ex. 14 | A3 | 60 | A4 | 40 | — | — | H7 | 11 | C1 | 0.50 |

| | Polyfunctional Monomer | | Physical Properties | | | | | |
|---|---|---|---|---|---|---|---|---|
| Ex. | Kind | Amount (wt part) | Ultimate Yield Strength kgf/cm² | Ultimate Elongation Length (%) | Flexural Modulus kgf/cm² | Heat Deformation Temperature (4.6 kgf) °C. | Izod Impact Value (notched) −30° C. | Boiling Xylene Insolubles Content (wt %) |
| Ex. 1 | G1 | 0.50 | 280 | — | — | — | — | 70.1 |
| Comp. Ex. 1 | — | — | 200 | — | — | — | — | 61.0 |
| Ex. 2 | G2 | 0.50 | 140 | — | — | — | — | 80.2 |
| Comp. Ex. 2 | — | — | 120 | — | — | — | — | 53.0 |
| Comp. Ex. 3 | — | — | 100 | — | — | — | — | 90.3 |
| Ex. 3 | G1 | 0.50 | 245 | 210 | 16,400 | 118 | 9.2 | 28.7 |
| Ex. 4 | ↓ | 0.50 | 135 | 270 | 7,600 | 84 | N.B. | 50.4 |
| Ex. 5 | ↓ | 0.50 | 240 | 230 | 10,000 | 100 | 23.2 | 40.0 |
| Ex. 6 | ↓ | 0.50 | 230 | 180 | 17,000 | 117 | | 29.4 |
| Ex. 7 | ↓ | 0.50 | 160 | 200 | 12,000 | 106 | | 37.9 |
| Ex. 8 | ↓ | 0.50 | 160 | 210 | 18,500 | 100 | 17.2 | 38.0 |
| Ex. 9 | ↓ | 0.50 | 280 | 170 | 20,500 | 121 | 6.8 | 39.1 |
| Ex. 10 | G1 | 0.50 | 220 | 276 | 15,100 | — | 10.1 | 27.3 |
| Comp. Ex. 4 | — | — | 208 | 276 | 16,000 | — | 7.8 | 10.7 |
| Ex. 11 | G1 | 0.50 | 210 | 235 | 12,000 | — | 9.1 | 32.1 |
| Comp. Ex. 5 | — | — | 194 | 239 | 12,900 | — | 6.0 | 10.3 |
| Ex. 12 | G1 | 0.50 | 220 | 190 | 12,800 | — | 7.9 | 28.2 |
| Comp. Ex. 6 | — | — | 202 | 176 | 13,100 | — | 5.8 | 10.5 |
| Ex. 13 | G1 | 0.50 | 250 | 230 | 16,000 | 107 | 4.0 | 20.2 |
| Ex. 14 | G1 | 0.50 | 225 | 190 | 13,000 | 117 | 10.2 | 36.7 |

TABLE 2

| | Composition | | | | | | | | |
|---|---|---|---|---|---|---|---|---|---|
| | Resin Component (A) | | Resin Component (B) | | Crosslinking Agent | | Polyfunctional Monomer | | |
| Ex. | kind | Amount (wt %) | Kind | Amount (wt %) | Kind | Amount (wt part)·1 | Kind | Amount (wt part)·1 | |
| Ex. 15 | A1 | 100 | — | — | C1 | 3.60 | G1 | 3.00 | |
| Ex. 16 | A1 | 100 | — | — | C1 | 3.60 | G1 | 3.00 | |
| Comp. Ex. 7 | A1 | 100 | — | — | — | — | — | — | |
| Comp. Ex. 8 | A1 | 100 | — | — | — | — | — | — | |
| Ex. 17 | A4 | 90 | B3 | 10 | C2 | 0.12 | G2 | 0.10 | |
| Ex. 18 | A4 | 90 | B3 | 10 | C2 | 0.12 | G2 | 0.10 | |
| Comp. Ex. 9 | A4 | 90 | B3 | 10 | — | — | — | — | |
| Comp. Ex. 10 | A4 | 90 | B3 | 10 | J1 | 0.20 | — | — | |
| Ex. 19 | A5 | 70 | B3 | 30 | D2 | 0.60 | G1 | 0.50 | |
| Ex. 20 | A6 | 20 | B2 | 80 | D1 | 0.24 | G1 | 0.20 | |
| Comp. Ex. 11 | A5 | 70 | B3 | 30 | — | — | — | — | |
| Comp. Ex. 12 | A6 | 20 | B2 | 80 | — | — | — | — | |
| Ex. 21 | A4 | 80 | — | — | E1 | 0.36 | G1 | 0.30 | |
| | A6 | 20 | | | | | | | |
| Ex. 22 | A4 | 60 | — | — | F1 | 0.36 | G1 | 0.30 | |
| | A6 | 40 | | | | | | | |
| Comp. Ex. 13 | A4 | 80 | — | — | — | — | — | — | |
| | A6 | 20 | | | | | | | |
| Comp. Ex. 14 | A4 | 60 | — | — | — | — | — | — | |
| | A6 | 40 | | | | | | | |

| | Composition Flame Retardant (I) | | Physical Properties | | | | |
|---|---|---|---|---|---|---|---|
| Ex. | Kind | Amount (wt part)·1 | Tensile Strength (kg/mm²) | Percent Heat Deformation (%) | Oxygen Index | Flame Retardance (UL-94 std.) | Boiling Xylene Insolubles Content (wt %) |
| Ex. 15 | I1 | 100 | 2.7 | — | 23 | | 62 |
| Ex. 16 | I1 | 150 | 2.1 | — | 27 | | 71 |
| Comp. Ex. 7 | I1 | 100 | 2.0 | — | 23 | | 52 |
| Comp. Ex. 8 | I1 | 150 | 1.6 | — | 27 | | 50 |
| Ex. 17 | I1 | 130 | 1.4 | 12 | 27 | | 62 |
| Ex. 18 | I1 | 200 | 0.7 | 8 | 35 | | 72 |
| Comp. Ex. 17 | I1 | 130 | 1.3 | 14 | 27 | | 58 |

TABLE 2-continued

| | | | | | | | |
|---|---|---|---|---|---|---|---|
| Comp. Ex. 10 | I1 | 200 | 0.4 | 8 | 35 | | 74 |
| Ex. 19 | I2 | 45·2 | 1.4 | >30 | — | V-2 | 40 |
| Ex. 20 | I1 | 100 | 1.2 | >30 | 25 | | 70 |
| Comp. Ex. 11 | I2 | 45·2 | 1.2 | >30 | — | V-2 | 14 |
| Comp. Ex. 12 | I1 | 100 | 1.0 | >30 | 25 | | 51 |
| Ex. 21 | I1 | 100 | 1.3 | 9 | 25 | | 65 |
| Ex. 22 | I1 | 100 | 1.2 | 1 | 25 | | 67 |
| Comp. Ex. 13 | I1 | 100 | 1.2 | 10 | 25 | | 51 |
| Comp. Ex. 14 | I1 | 100 | 1.2 | 2 | 25 | | 52 |

*1: The total amount of resin component (A) and/or (B) is assumed to be 100 parts by weight.
*2: Containing 30 and 15 parts by weight of I2 and antimony trioxide, respectively.

TABLE 3

| | Composition | | | | | | | | |
|---|---|---|---|---|---|---|---|---|---|
| | Resin Component (A) | | Resin Component (B) | | Crosslinking Agent | | Polyfunctional Monomer | | |
| Ex. | Kind | Amount (wt %) | Kind | Amount (wt %) | Kind | Amount (wt %) | Kind | Amount (wt %) | |
| Ex. 23 | A7 | 80 | B3 | 20 | D2 | 0.7 | G1 | 0.8 | |
| Ex. 24 | A8 | 80 | B3 | 20 | E2 | 0.7 | G1 | 0.8 | |
| Comp. Ex. 15 | A7 | 80 | B3 | 20 | — | — | — | — | |
| Comp. Ex. 16 | A8 | 80 | B3 | 20 | — | — | — | — | |

| | Physical Properties | | | |
|---|---|---|---|---|
| | Composition Flame Retardant | | Izod Impact Value | Flame Retardance | Boiling Xylene Insolubles Content |
| Ex. | Kind | Amount (wt part)·1 | (kg · cm/cm) 23° C. | (UL-94 std.) | (wt %) |
| Ex. 23 | I3 | 7 | 26 | V-0 | 95 |
| Ex. 24 | I3 | 7 | 30 | V-0 | 94 |
| Comp. Ex. 15 | I3 | 7 | 18 | V-0 | 75 |
| Comp. Ex. 16 | I3 | 7 | 21 | V-0 | 75 |

*1: The total amount of resin component (A) and/or (B) is assumed to be 100 parts by weight.

What is claimed is:

1. A filler-incorporated thermoplastic resin composition comprising:
   100 parts by weight of a thermoplastic resin containing a partially crosslinked composition, said partially crosslinked composition being prepared by dynamically heat-treating a composition consisting essentially of a material selected from the group consisting of
   (A) a thermoplastic resin,
   (B) a rubbery substance and a mixture of (A) and (B) in the presence of a crosslinking agent selected from the group consisting of
   (C) a dihydroaromatic compound or a polymer thereof,
   (D) an ether compound,
   (E) a tetrahydroaromatic compound and
   (F) a cyclopentance compound, in combination with
   (G) a polyfunctional unsaturated monomer; and
   (H) 5-200 parts by weight of a filler.

2. A resin composition as set forth in claim 1, wherein said crosslinking agent selected from said compounds (C), (D), (E) and (F) and said polyfunctional unsaturated monomer (G) are used in an amount of 0.01 to 7 parts by weight based on 100 parts of the thermoplastic resin composition.

3. A resin composition as set forth in claim 1, wherein said thermoplastic resin is a polyolefin resin.

4. A resin composition as set forth in claim 1, wherein said rubbery substance is an ethylene-propylene copolymer rubber or an ethylene-propylene-diene copolymer rubber.

5. A resin composition as set forth in claim 1, wherein said polyfunctional unsaturated monomer is a bismaleimide compound or a di(meth)acrylate compound.

6. A resin composition as set forth in claim 1, wherein said filler is at least one member selected from the group consisting of inorganic fillers and flame retardants.

7. A resin composition as set forth in claim 6, wherein said flame retardants are inorganic flame retardants.

8. A resin composition as set forth in claim 7, wherein said inorganic flame retardants are hydrates of inorganic metallic compounds.

9. A resin composition as set forth in claim 8, wherein said hydrates of inorganic metallic compounds are aluminum hydroxide, magnesium hydroxide, basic magnesium carbonate, and hydrotalcite.

10. A resin composition as set forth in claim 1, wherein said dihydroaromatic compound (C) is a 1,2-dihydroquinoline compound, a polymer thereof or 9,10-hydrophenanthrene, said ether compound (D) is a dihydropyran or isopropenyl acetate, said tetrahydroaromatic compound (E) is 1,2,3,4-tetrahydronapthalene, tetrahydrobenzene or tetrahydrofuran, and said cyclopentane compound (F) is indene.

* * * * *